United States Patent Office.

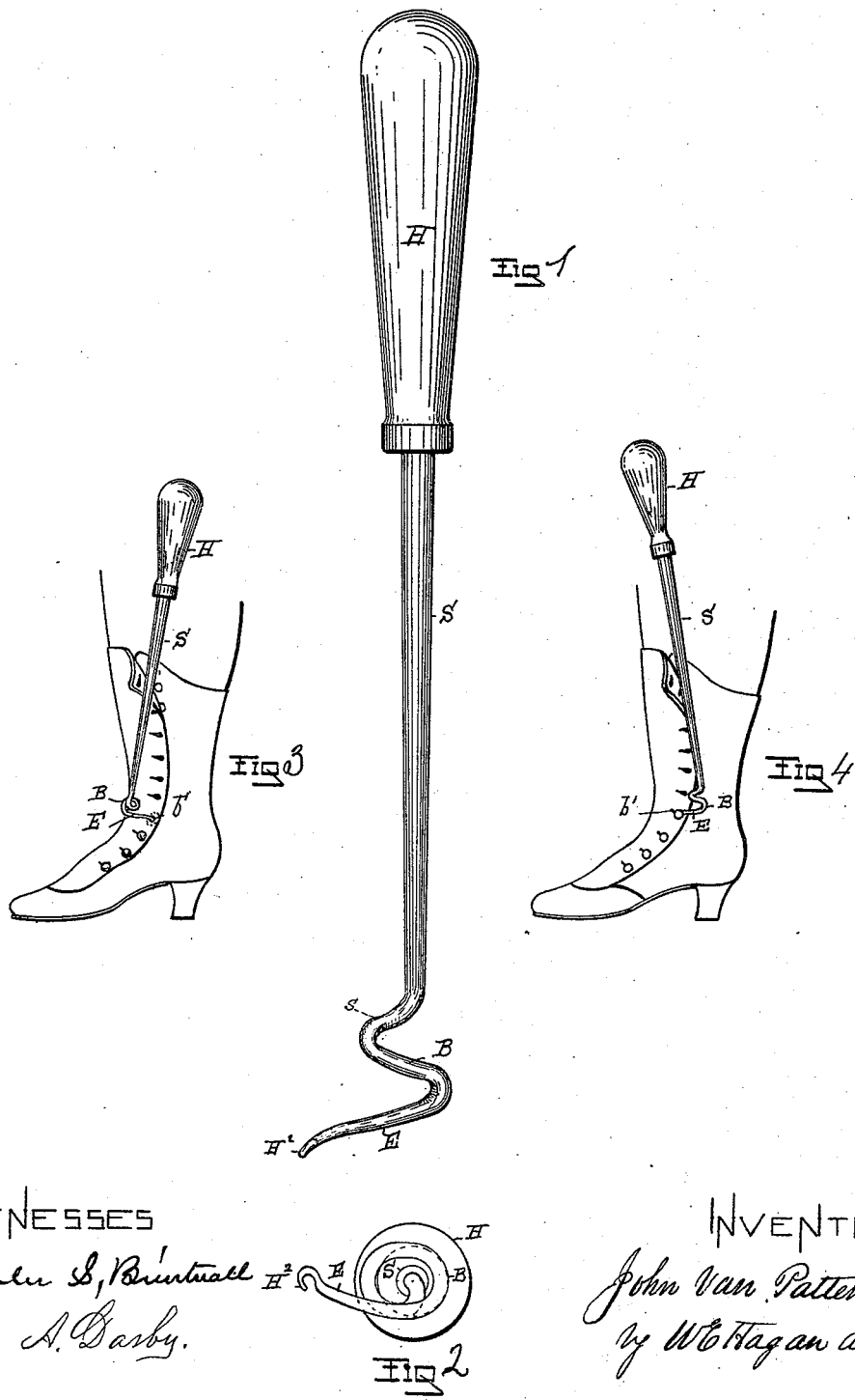

JOHN VAN PATTEN, OF WEST TROY, ASSIGNOR OF ONE-HALF TO WILLIAM E. HAGAN, OF TROY, NEW YORK.

BUTTON-HOOK.

SPECIFICATION forming part of Letters Patent No. 473,035, dated April 19, 1892.

Application filed October 24, 1890. Serial No. 369,164. (No model.)

*To all whom it may concern:*

Be it known that I, JOHN VAN PATTEN, of the village of West Troy, county of Albany, and State of New York, have invented a new and useful Improvement in Button-Hooks, of which the following is a specification.

My invention relates to improvements upon that class of devices which are termed "button-hooks," and which are used to button shoes. This class of implements as heretofore constructed has been made with a handle and straight shank, upon the lower end of which was arranged a hook, and was operated by passing the hook end of the implement, with the shank and handle held horizontally, through one of the buttonholes of the shoe, so that the hook would engage with the button-eye shank, and then using the buttonhole as a fulcrum and the handle of the hook as a lever to draw the button under and up through the buttonhole, which being done the implement was again turned down laterally, so that the hook could be disengaged from the button-eye shank by pushing the hook away from its engagement with the latter.

With the button-hook arranged on the end of a straight-handle shank to button the shoe and to remove the hook called for the downward and lateral extension of the handle, and this involved the necessity of raising the foot or stooping of the person using the implement, which position is an uncomfortable one, particularly for stout people. To construct a button-hook so that the whole operation of buttoning the shoe and removing the button-hook can be performed without the downward and lateral movement of the handle is the object of my invention; and this I accomplish (as will be more fully detailed hereinafter in connection with its illustration) by producing a bend in the handle-shank of the implement and by extending the lower end of the shank away from the bend and forming the hook upon the lateral extension of the shank.

Accompanying this specification to form a part of it there is a sheet of drawings containing four figures illustrating my invention, with the same designation of parts by letter-reference used in all of them.

Of the illustrations Figure 1 is a side elevation of my improved button-hook. Fig. 2 is an end view of the same with the hook end facing the view. Fig. 3 shows my improved hook as applied to connect with a button by being passed through one of the buttonholes of a shoe. Fig. 4 shows the position of the hook after having been turned by the handle to draw the button through the buttonhole and in a position to be moved away from engagement with the button.

The several parts of the implement thus illustrated, as well as the shoe, are designated by letter-reference, and the function of the operating parts is described as follows:

H designates the handle of the device, which may be of any preferred form.

S is the shank bent at the point $s$ and again at the point B to form a lateral extension E, which terminates in a hook $H^2$. The twist in the shank is substantially spiral, and the hook extension E is practically at right angles to the handle H.

This construction or form of the buttoner permits the operation of buttoning to be done by simply giving the device a rotary movement when held in upright position.

The implement thus made is used as follows: The operator, grasping the handle, passes the hook end $H^2$ of the lateral extension of the shank S through one of the buttonholes $b'$, so as to have the hook pass around the eye-shank of the button upon the shoe-upper which is opposite the said buttonhole, as shown at Fig. 3, and then by means of the handle H, to turn the implement so as to bring the button up through the buttonhole with the implement in the position shown at Fig. 4, in which position by moving the hook end laterally away from the button the hook is disengaged from the latter, and during which operation of buttoning and removing the implement the latter is held nearly perpendicular.

As thus made and arranged the button-hook herein described may be used to button shoes and be disconnected from the button by a simple rotation of the handle H.

Having thus described my invention, what I claim, and desire to secure by Letters Patent, is—

The shoe-buttoner herein described, consisting of a handle and a shank secured thereto, made of a single piece of wire having a straight upper portion, a laterally-extended spiral twist at the end thereof, and a lower portion struck at substantially right angles to the shank and terminating in a button-hook.

Signed at Troy, New York, this 20th day of August, 1890, and in the presence of the two witnesses whose names are hereto written.

JOHN VAN PATTEN.

Witnesses:
J. G. L. VAN PATTEN,
CHARLES S. BRINTNALL.